Aug. 25, 1931.   H. COOPER   1,820,442
POWER TRANSMISSION MECHANISM
Filed Jan. 29, 1924   3 Sheets-Sheet 1
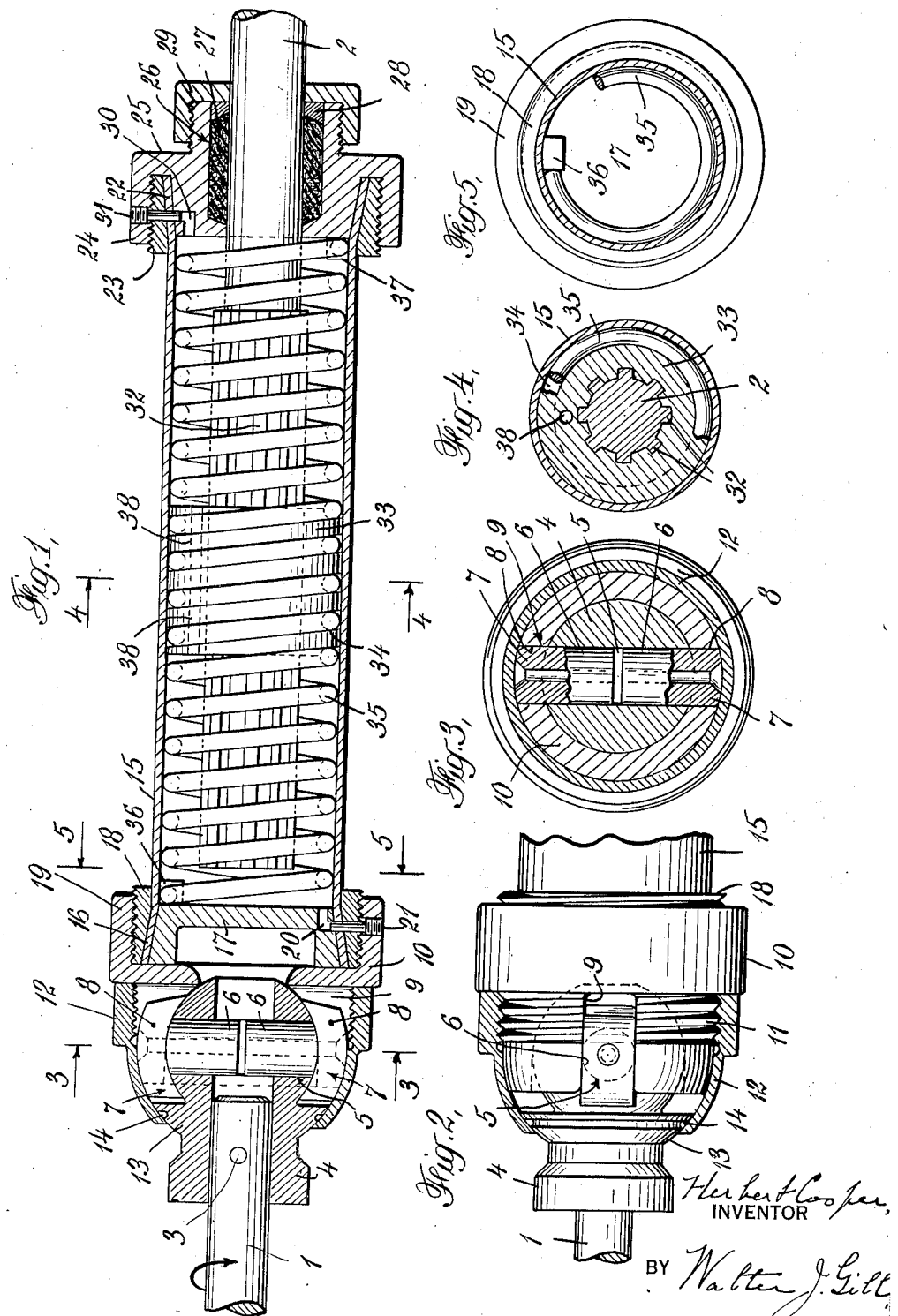
INVENTOR
Herbert Cooper
BY Walter J. Gill
ATTORNEY

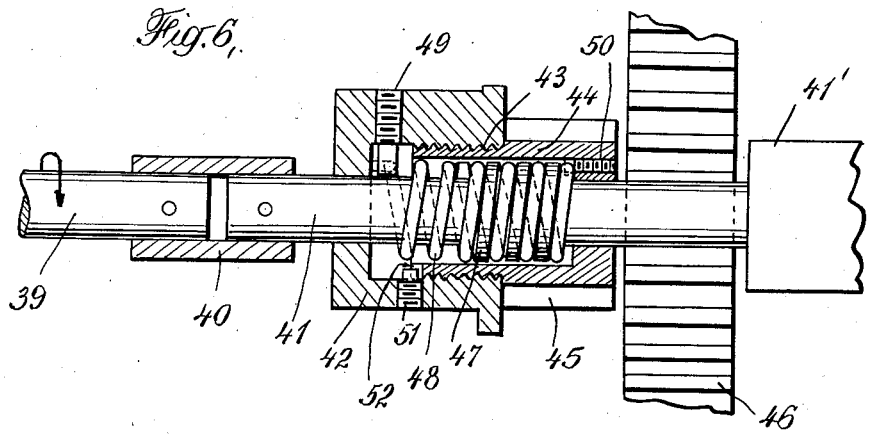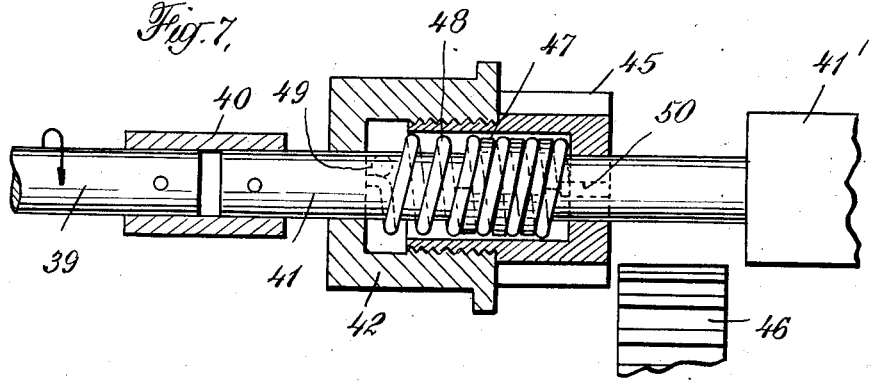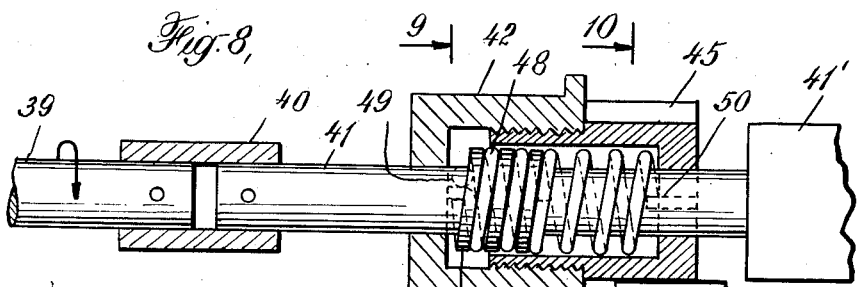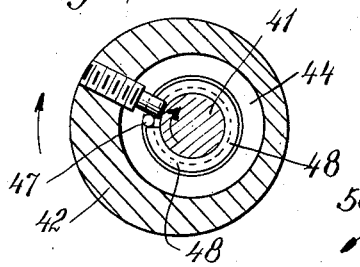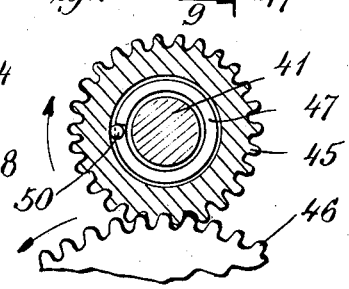

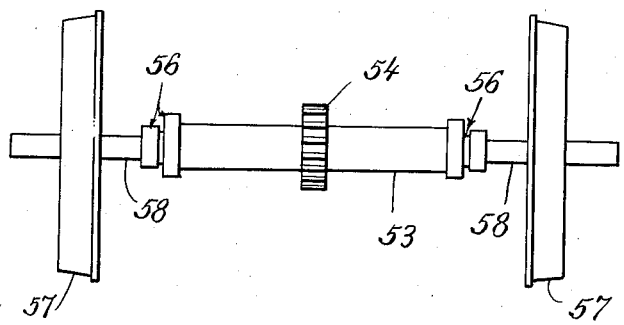
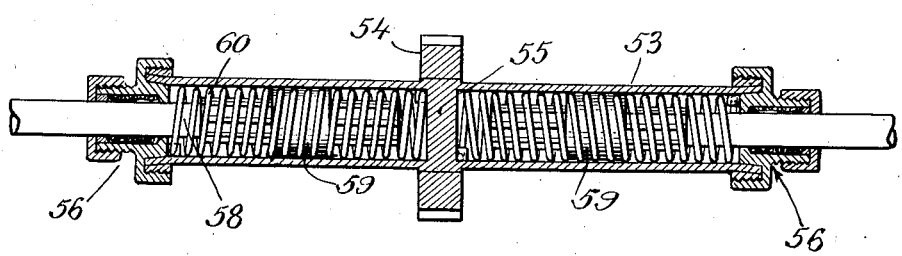

Patented Aug. 25, 1931

1,820,442

UNITED STATES PATENT OFFICE

HERBERT COOPER, OF BROOKLYN, NEW YORK

POWER TRANSMISSION MECHANISM

Application filed January 29, 1924. Serial No. 689,296.

This invention relates to resilient, power transmission mechanism of the type having an element which is capable of absorbing shocks due to changes in the relative speed of the parts of a power transmission system between which the element is positioned.

In my Patent #1,218,929 issued March 13, 1917 there is shown mechanism of this character consisting of a casing attached at one end to one of two shafts between which power is to be transmitted and which is internally threaded to receive a worm which is slidably mounted upon one end of the other shaft, which extends into the other end of the casing through a stuffing box. Within the casing, on each side of the worm, is a spring, one end of which is engaged by a projection on the end of the worm and the other end of which is engaged by a projection at the end of the casing. The casing is filled with a suitable liquid, such as oil, which may flow from one side of the worm to the other through an adjustable by-pass in the worm.

When the casing is rotated, as by the shaft which is fixed thereto, the worm moves toward that end of the casing to which the shaft is attached, displacing the oil which flows through the by-pass to the other side of the worm, and winding up the spring between the worm and the same end of the casing. The other shaft remains stationary until the pressure of the worm on the oil and the spring balances the torque necessary to start the other shaft in rotation. This shaft will gradually attain its normal speed with constant acceleration and when this occurs a reaction takes place due to the fact that all parts are now in motion and the high starting torque is reduced to the normal running torque. The worm will therefore be returned by the unwinding of the previously wound spring to such a position in the casing that the tension on the spring balances the power necessary to keep the driven shaft running at the required speed.

It is an object of this invention to provide shock absorbing mechanism of the general type shown in my patent, which in addition to more effectively transmitting power and absorbing shocks due to relative changes in speed of driving and driven elements also absorbs shocks due to relative movement of the elements in directions other than those in which they normally move, as for instance relative longitudinal movement between driving and driven shafts.

Another object of the invention is the simplification of structure and the reduction of the cost of manufacture of shock absorbing mechanism of the type referred to above.

These objects, as well as others which will hereinafter appear, are attained by providing a single spring within the casing of the device, which in addition to its function as one of the shock absorbing elements of the mechanism also serves as a thread for the worm which is slidably mounted within the casing, instead of being threaded thereto, as in the patent and is provided with a restricted passage for the gradual flow between the chambers in the casing of liquid which serves as the other shock absorbing element of the mechanism. Smooth bore tubing which may be of lesser thickness than is required if it be internally threaded may therefore be used for the casing with consequent reduction in manufacturing costs.

The mechanism of the invention is adapted to a wide variety of uses, and by way of illustration typical instances of such uses are shown in the accompanying drawings and will be hereinafter described. One of the embodiments shows the mechanism used in connection with the transmission of power between two shafts substantially in alignment. Another embodiment shows the application of the invention to the transmission of power between a starter for an internal combustion engine and the engine itself until the latter has begun to operate.

A third embodiment is a driving connection between a source of power and the wheels of a vehicle to give the differential effect required when the vehicle is traveling on a curved path, but which automatically eliminates such effect when either of the wheels should be positively driven independently of the other wheel, to move the vehicle, as for instance if one of the wheels loses its traction. With the forms of differential mechanism ordinarily employed in motor driven vehicles power cannot be applied to one wheel if the other wheel loses its tractive effect, as by slipping on the ground, and considerable difficulty is often encountered in starting vehicles under such conditions.

In the accompanying drawings illustrating the modifications mentioned above, Fig. 1 represents a longitudinal, sectional view of the mechanism used for the transmission of power between two aligned shafts, Fig. 2 is a view partly in section of the left-hand end of the mechanism of Fig. 1 along a plane at right angles to the section plane of that figure, Figs. 3, 4 and 5 are transverse sections along the lines 3—3, 4—4 and 5—5, respectively, of Fig. 1, Fig. 6 is a longitudinal sectional view of an application of the invention to a starter for internal combustion engine, showing the initial position of the elements, Fig. 7 is a view similar to Fig. 6, but taken along a plane at right angles to the section plane of that figure, Fig. 8 is a view similar to Fig. 6, but showing the position of the elements at a subsequent stage of operation, Figs. 9 and 10 are transverse sectional views along the lines 9—9 and 10—10, respectively, of Fig. 8, Fig. 11 is an external view of an embodiment of the invention adapted for use in the transmission of power to the wheels of a car, the usual and well known elements of the car structure being omitted for the sake of clearness, and Fig. 12 is a longitudinal sectional view of the power transmission mechanism of Fig. 11.

Considering particularly Figs. 1 to 5 inclusive, 1 represents a shaft which for convenience will be hereinafter referred to as the driving shaft and 2 a shaft which will be similarly referred to as the driven shaft, although it will be understood that the relation of these shafts may be reversed. Attached to the end of the shaft 1 as by means of a pin 3 is the ball member 4 of a universal coupling which is herein shown as of the general type disclosed in my Patent No. 1,368,607 issued February 15, 1921. The ball member 4 is provided with a transverse bore 5 within which are fitted the shanks 6 of drivers 7 having flat sided heads 8 which are curved on their inner faces to conform to the curvature of the ball member and concentrically curved on their outer faces. The drivers fit within diametrically opposite slots 9 in a member 10 which is provided with a threaded portion 11 for receiving a collar 12 having a curved portion of substantially the same curvature as the outer faces of the drivers and engaging a flange 13 projecting from the ball member. The flange may be provided with a channel 14 to receive suitable lubricant or lubricant retaining material.

15 represents a casing within the swaged end 16 of which is placed an end member 17 which serves as a closure for the end of the casing. Surrounding the swaged end of the casing is a collar 18 which is externally threaded to coact with an internally threaded portion 19 of the member 10, the arrangement being such that when the elements are screwed together the member 10 and the parts of the universal joint associated therewith will be firmly attached to the end of the casing forming a liquid-tight joint. To permit the casing to be filled with suitable liquid a passage 20 is provided through the end member 17, the swaged end 16 of the casing, collar 18 and threaded portion 19 of member 10, the passage being closed by a suitable screw plug 21.

The other end of the casing is swaged as at 22 and surrounded by a collar 23 which is screwed within an internally threaded flanged portion 24 of an end member 25 having a tapering central portion fitting within the swaged end of the casing and provided with an aperture for the shaft 2. The end member is recessed as at 26 to receive suitable packing material 27 which is held in place against the shaft by a ring 28 which in turn is held in place by a cap 29 threaded onto the outer end of the member 25 and through which the shaft 2 extends. The elements just described constitute a closure and stuffing box for the end of the casing to prevent leakage of fluid therefrom, which may be supplied to the casing through a passage 30 closed by a plug 31.

The end of shaft 2 lying within the casing is provided with a plurality of radial projections 32 to provide a series of longitudinal channels or splines for receiving the correspondingly shaped portion of a worm 33 which is thus slidably mounted upon the end of the shaft and fits closely within the casing. The outer face of the worm is provided with a thread 34 through which pass some of the convolutions of a helical spring 35 extending from one end of the casing to the other at which points its ends engage lugs 36 and 37 projecting inwardly from the end members 17 and 25 respectively. The worm is provided with a longitudinal passage 38 through which the liquid in the casing may flow from the chamber on one side of the worm to that on the other side, it being understood that the passage 38 may be provided at its ends with suitable devices for restricting the flow of fluid, but which for simplicity have been omitted from the drawings. In practise the spring will be placed under compression within the casing, the degree of compression and the strength of the spring being like the other elements of the mechanism designed for the power which the mechanism is designed to transmit in the system in which it is to be used as a shock absorbing device.

In the operation of the mechanism described above, assuming that the driving shaft 1 is started into rotation in the direction of the arrow the casing 15 will be turned in the same direction carrying with it the spring 35. Initially on account of the friction between the convolutions of the spring which are in engagement with the threads on the worm the effect will be the same as if this portion of the spring were locked to the splined end of the shaft 2, and the portions of the spring lying between this region and the ends of the casing will be wound up to a certain degree until the friction is overcome, whereupon the worm 33 will be moved within the casing due to its threaded connection with the spring. In the embodiment illustrated this movement will be toward the end of the casing to which the driving shaft is connected. As soon as the worm begins to move along the splined end of the driven shaft which is still stationary there will be a flow of liquid from the chamber between the worm and the end of the casing to which the driving shaft is connected through the passage 38 into the chamber at the other end of the casing, but on account of the restricted flow of liquid through this passage the advance of the worm toward the end of the casing will increase the pressure upon the liquid in this portion of the casing until it becomes sufficient to overcome the inertia and resistance of the shaft 2 and the parts connected thereto, whereupon the latter will begin to turn. At the same time the change of position of the worm within the casing will cause one or the other of the portions of the spring lying between the worm and the ends of the casing to be placed under further compression and even partly wound up as initially explained. The spring will thus function as a power transmitting element between the driving shaft and casing on the one hand and the worm and driven shaft on the other hand, similar to the function performed by one or the other of the springs of my Patent No. 1,218,929 mentioned above.

As in the case of the prior arrangement the driven shaft will gradually attain its normal speed without shock due to the gradual application of torque thereto by the liquid and the spring elements of the mechanism. When the driven shaft attains its normal speed less torque will be required to drive it and the wound portion of the spring will be unwound to some extent and there will be a reverse movement of the worm within the casing with consequent reduction in the pressure on the liquid and lessening of the compression on the spring until the effect of these elements is just sufficient to permit the shaft 2 to be driven at its normal speed. This change in the relation of the elements of the mechanism will occur gradually and therefore without shock until ultimately both shafts are running at their normal speeds and in a similar manner any change in the speed of the shafts due to changes in power applied to the driving shaft or in the load on the driven shaft will take place without shock effects, such as would occur if the shafts were rigidly connected together. The provision of the universal joint between the driving shaft and the mechanism permits the shafts to run even when out of exact alignment permanently or temporarily thus still further increasing the smoothness and effectiveness by which power may be transmitted from one shaft to the other.

On account of the sliding fit of the worm 33 within the casing 15 as well as upon the splined end of shaft 2 relative movement between these elements may occur when there is relative movement in a longitudinal direction between the shafts 1 and 2. Such movement will be resisted by the spring 35 and the liquid within the casing, which can flow only gradually from one side of the worm to the other, but the resistance which they offer will be of a yielding character to cushion the effect of sudden changes in the relative positions of the shafts in a longitudinal direction, or in other words the mechanism will absorb shocks due to sudden thrusts of the shafts.

While the invention has been described in connection with a mechanism for transmitting power between two substantially aligned shafts, which well illustrates the character of the invention, it is equally adapted for use in connection with other arrangements in which it is desirable that power be transmitted unaccompanied by shocks when starting or stopping or under conditions of changes of speed in the parts of the system. A field in which the invention may thus be of particular utility is found in the transmission of power from a self-starter to an internal combustion engine, in which cases it is desirable that such transmission take place gradually without shock. In Figs. 6 to 10 inclusive there is shown an embodiment of the invention particularly intended for this purpose. 39 represents the shaft of a self-starter of any suitable type, which is connected by a coupling 40 to a shaft 41 supported at its other end in a bearing 41'. Slidably mounted on the shaft and preferably eccentrically arranged with respect to the shaft is a casing member 42 provided with an internally threaded portion 43 within which is screwed a gear member 44 having a pinion portion 45 adapted when the mechanism is in operation to engage a gear-wheel 46 connected to the internal combustion engine which is intended to be cranked by the self-starter.

A portion of the shaft 41 that passes through the chamber formed within the members 42 and 44 is provided with a helical shoulder 47 forming a worm upon the shaft. Threaded through this worm is a spring 48 the ends of which engage abutments on the inner faces of the members 42 and 44. As shown herein these abutments consist of the inwardly extending ends of screw plugs 49 and 50 which also serve as closures for passages through the walls of the members 42 and 44 respectively by which liquid may be supplied to or drained from the chamber formed within these members. For the purpose of holding the gear member 44 in place within casing member 42 after it has been screwed into the latter there is provided a plug 51, the inner end of which fits within a recess 52 in the inner end of the gear member 44.

In the operation of this embodiment of the invention assuming the gears to be disengaged as in Figs. 6 and 7 and the shaft 39 to be started into rotation in the direction of the arrow shown in the figures by the motor to which the shaft is connected, there will be an initial relative movement of the shaft within the casing and gear members 42 and 44 due to the inertia of the members aided by the unsymmetrical disposition of the mass of the members which also tends to keep them in a fixed position and has the further advantage of preventing them from turning on the shaft due to vibration and jars of the vehicle on which the mechanism is mounted, with possible accidental engagement of the gears.

The relative movement of the shaft with respect to the casing and gear members will, on account of the worm and spring connection between the members and the shaft cause a slight advance of the members until the outer end of the pinion 45 engages the teeth of gear-wheel 46. Since the internal combustion engine is not in operation the casing and gear members and spring of the device will be held against rotation while the shaft 41 and the worm will turn with respect to the other parts. As a result of the turning of the worm within the convolutions of the spring the gear 45 will be advanced into further engagement with the teeth of gear wheel 46 while a section of the spring will be placed under compression and fluid within the casing and gear members will be placed under pressure until the inertia and resistance to movement of the engine will be overcome, whereupon it will be given the initial cranking necessary to start it into operation. On account of the formation of the worm directly upon the shaft a passage through the worm is dispensed with and the required restricted flow of fluid from one side of the worm to the other is obtained through the relatively narrow annular passage between the worm and the inner face of gear member 44, this passage being determined by the closeness of fit of the worm within the member.

As in the case of the embodiment of the invention previously described power will be transmitted from the self-starter to the engine gradually and without shock due to the resilient connection afforded by the spring and the liquid within the casing members of the device. When the engine begins to operate under its own power the gear-wheel 46 will be driven at greatly increased speed carrying with it the casing and gear members of the device and tending to drive the self-starter at correspondingly increased speed. On account of the resistance offered by the latter the conditions of the parts will thus be reversed, the casing and gear members now acting as driving members and the shaft and worm as driven members. As a result there will be a reverse movement of the worm with respect to the spring on which it is threaded which will be accompanied by a reversed movement of these members until the pinion 45 is disengaged from the gear-wheel 46 so that the engine will run freely without opposition offered by the starter. Like the initial cranking operation the disengagement of the gears will take place without shock and therefore without injurious effects upon any part of the system.

Not only may the invention be used for the transmission of power from one member to another, but it is equally adapted for use in transmitting power from a source to a plurality of members to be driven therefrom. The invention thus finds a field of usefulness in the transmission of power from a propelling engine or motor to the wheels of a vehicle. In such cases it is particularly well adapted to give the differential effect required to properly transmit power effectively to the two wheels of the vehicle when the latter is traveling over a curved path, but this effect is automatically eliminated in case one of the wheels loses its traction with the ground, to cause power to be applied directly to the other wheel to propel the vehicle. Under all of these conditions the mechanism of the invention performs its function as a resilient, power transmitting mechanism between the source of propelling power and the wheels.

Such an embodiment of the invention is shown in Figs. 11 and 12 in which 53 represents a casing provided at its center with an external pinion 54 adapted to be connected to the propelling motor which, since it forms no part of the present invention, has been omitted. The casing is provided at its center with a transverse partition 55 which also acts as a reinforcing web for the pinion 54. At its ends the casing is provided with closures 56 in the form of stuffing boxes similar to the one described in connection with Fig. 1 and therefore not requiring description in detail. Each of the wheels 57 of the vehicle is provided with a shaft 58 extending through the corresponding stuffing box 56 into one of the sections of the casing, where it is provided with a worm 59 threaded upon a spring 60 as has been described in detail in connection with Fig. 1, the worm being provided with a restricted passage for the flow of fluid between the chambers of the casing as also previously described.

In the operation of this embodiment power will be transmitted to the casing from the propelling engine or motor through pinion 54 and if the vehicle is traveling in a straight path power will be transmitted equally to the shafts 58 and wheels 57 through the springs, worms and fluid in the same manner that power is transmitted from the shaft 1 and casing 15 to the worm 33 and shaft 2 of the embodiment shown in Fig. 1. Power will be gradually applied and transmitted without shocks in the same manner as already described.

When the vehicle begins to turn, the wheel on the outer radius of curvature should be propelled at higher speed than the other one and the present arrangement provides for the automatic adjustment of the application of power as required due to the fact that the section of the mechanism associated with the outer wheel will cause more power to be applied to this wheel than to the other wheel by changes in the relative position of the worm in this section of the mechanism as compared with the position of the worm in the other section of the mechanism, the worms automatically taking up the positions required for the proportionate share of the power which each one is to transmit to its corresponding wheel. Under these conditions also the transmission of power will be effected without shocks due to the required changes in the relative speed of the two wheels or on account of changes in speed of the vehicle as a whole while rounding a curve.

If one of the wheels loses its traction as by slipping on the ground the continued turning of the casing with respect to the shaft of the other wheel which it will be assumed has tractive contact with the ground will cause its worm to be advanced toward the end of the casing or the partition 55, as the case may be, until the combined effect of the spring and the pressure on the liquid in the casing is sufficient to turn the wheel. As this wheel has traction with the ground the vehicle will be propelled in spite of the loss of traction at the other wheel. When this other wheel regains its tractive effect the worm on its shaft as well as the worm on the shaft of the other wheel will automatically assume the positions required for transmission of power to both wheels. The changes in the condition of the mechanism will take place without shocks or even jamming effects in case it is necessary for the worm of the tractive wheel to reach its limit of movement before sufficient power can be applied to this wheel to start the vehicle, on account of the cushioning effect of the spring and the liquid within the casing.

While certain embodiments of the invention have been shown and described to illustrate its wide utility, it will be understood that it may be embodied in other forms adapted for a wide range of applications and also that various changes may be made in the structural details of all of the embodiments without departing from the principle of the invention as defined in the appended claims.

I claim:—

1. In resilient, power transmission mechanism, the combination of a driving element, a driven element, a liquid-containing member connected to one of the elements, a helical, resilient member connected to the first member and a part cooperatively related to an intermediate portion of the resilient member, mounted for longitudinal movement on the other element and provided with a passage for the flow of liquid from one side thereof to the other.

2. In resilient, power transmission mechanism, the combination of a driving element, a driven element, a hollow member connected to one of the elements and into which one end of the other element extends, a helical, resilient member within the hollow member and a part movably related to an intermediate portion of the resilient member and mounted for longitudinal movement on the end of the element within the hollow member.

3. In resilient, power transmission mechanism, the combination of a driving element, a driven element, a casing connected to one of the elements and into which one end of the other element extends, a helical spring within the casing and a part threaded upon the spring and mounted for longitudinal movement on the end of the element within the casing.

4. In resilient, power transmission mechanism, the combination of a driving element, a driven element, a liquid-containing, hollow member connected to one of the elements and into which one end of the other element extends, a helical, resilient member within the hollow member and a part cooperatively related to an intermediate portion of the resilient member, mounted for longitudinal movement on the end of the element within the hollow member and provided with a passage to permit flow of liquid from the space within the hollow member on one side of the part to that on the other side when the part moves within the hollow member.

5. In resilient, power transmission mechanism, the combination of a driving element, a driven element, a liquid-containing casing connected to one of the elements and into which one end of the other element extends, a helical spring within the casing and a worm threaded upon the spring, mounted for longitudinal movement upon the end of the element within the casing and provided with a passage to permit flow of liquid from the space within the casing on one side of the worm to that on the other side when the worm moves with the casing.

6. A shock absorbing device for a power transmission system, comprising a hollow member adapted to be attached to one of the elements of the system and surrounding one end of another element of the system, a helical, resilient member within the hollow member and a part coacting with an intermediate portion of the resilient member and slidably, but non-rotatably mounted upon the end of the element within the hollow member.

7. A shock absorbing device for connecting the driving element of a power transmission system to a driven element comprising a helical, resilient member connected to one of the elements and a member movably coacting with an intermediate part thereof and connected to the other element to turn the same but mounted for longitudinal movement thereon.

8. A shock absorbing device for connecting the driving element of a power transmission system to a driven element, comprising a helical spring connected to one of the elements and a worm threaded upon the spring and connected to the other element to turn the same, but adapted to move longitudinally thereof.

9. A shock absorbing device for connecting the driving element of a power transmission system to a driven element, comprising a helical spring connected to one of the elements, a worm threaded upon the spring and connected to the other element to turn the same, but adapted to move longitudinally thereof, a liquid containing casing surrounding the worm and spring, connected to one of the elements and movably related to the other and means for permitting flow of liquid from one side of the worm to the other when it moves longitudinally.

10. A shock absorbing device for connecting the driving element of a power transmission system to a driven element, comprising a helical spring connected to one of the elements, a worm threaded upon the spring and connected to the other element to turn the same, but adapted to move longitudinally thereof, a liquid containing casing surrounding the worm and spring and defining a chamber on each side of the worm, said casing being connected to one of the elements and movably related to the other, and means for permitting flow of fluid from one chamber to the other when the worm moves longitudinally.

11. In resilient, power transmission mechanism, the combination of driving and driven elements, a member associated with one element, a member associated with the other element, said members being movable relatively to each other and a resilient member connected to the first member and movably coacting at an intermediate portion of its length with the second member.

12. In resilient, power transmission mechanism, the combination of driving and driven elements, a liquid containing casing associated with one element and a worm within the casing and associated with the other element, said casing and worm being movable relatively to each other, a spring connected to the casing and coacting at an intermediate portion of its length with the worm and means permitting a restricted flow of liquid from the chamber in the casing on one side of the worm to the chamber on the other side upon relative movement between the casing and worm.

13. In resilient, power transmission mechanism, the combination of driving and driven elements, a member associated with one element, a worm associated with the other element, said member and worm being movable relatively to each other and a spring connected to the member and coacting at an intermediate portion of its length with the worm.

In testimony whereof I affix my signature.
HERBERT COOPER.